United States Patent
Dagan (10) Patent No.: US 9,459,942 B2
(45) Date of Patent: Oct. 4, 2016

(54) CORRELATION OF METRICS MONITORED FROM A VIRTUAL ENVIRONMENT

(75) Inventor: Assaf Dagan, Yehud (IL)

(73) Assignee: Hewlett Packard Enterprise Development LP, Houston, TX (US)

(*) Notice: Subject to any disclaimer, the term of this patent is extended or adjusted under 35 U.S.C. 154(b) by 1499 days.

(21) Appl. No.: 12/870,428

(22) Filed: Aug. 27, 2010

(65) Prior Publication Data
US 2012/0054331 A1    Mar. 1, 2012

(51) Int. Cl.
| | |
|---|---|
| *H04L 12/26* | (2006.01) |
| *G06F 11/07* | (2006.01) |
| *G06F 11/30* | (2006.01) |
| *G06F 11/32* | (2006.01) |
| *H04L 12/24* | (2006.01) |

(52) U.S. Cl.
CPC ......... *G06F 11/0712* (2013.01); *G06F 11/079* (2013.01); *G06F 11/0754* (2013.01); *G06F 11/301* (2013.01); *G06F 11/3006* (2013.01); *G06F 11/328* (2013.01); *H04L 41/064* (2013.01); *H04L 43/0817* (2013.01)

(58) Field of Classification Search
CPC .................................................. H04L 43/0817
USPC .................................................. 709/223, 224
See application file for complete search history.

(56) References Cited

U.S. PATENT DOCUMENTS

| | | | |
|---|---|---|---|
| 6,643,613 B2 | 11/2003 | McGee et al. | |
| 6,807,156 B1* | 10/2004 | Veres ................. | H04L 41/5067 370/252 |
| 7,076,695 B2 | 7/2006 | McGee et al. | |
| 7,725,570 B1* | 5/2010 | Lewis ................ | G06Q 10/04 709/223 |
| 7,783,694 B2* | 8/2010 | Perng ................. | H04L 41/5003 708/422 |
| 8,195,815 B2* | 6/2012 | Woodman ........... | G06Q 20/102 370/230 |
| 2006/0117059 A1 | 6/2006 | Freeman, Jr. et al. | |
| 2008/0016412 A1 | 1/2008 | White et al. | |

* cited by examiner

*Primary Examiner* — Asghar Bilgrami
(74) *Attorney, Agent, or Firm* — International IP Law Group, PLLC (57) ABSTRACT

Correlation of metrics monitored from a virtual environment is described herein. A method for detecting correlations between metrics monitored from a virtual environment includes monitoring network operation metrics of network devices in the virtual environment. Network operation metric irregularities exceeding a threshold are detected. A first network operation metric irregularity is selected from the detected network operation metric irregularities. A time frame of the first network operation metric irregularity is identified for analysis. A second network operation metric irregularity is selected from the detected network operation metric irregularities. The first network operation metric irregularity and the second network operation metric irregularity can be compared to determine a correspondence between the first network operation metric irregularity and the second network operation metric irregularity using a comparison engine and based on a predetermined analysis method.

15 Claims, 10 Drawing Sheets

FIG. 1

| Metric Name 210 | Dimensions 215 | Data Collector 220 | Abnormal Start Time 225 | Preview 230 |
|---|---|---|---|---|
| BPM | | | | |
| Response Time | Location: Vancouver, Monitored Ct: Login... | BPM | 8:25 9/9/09 | |
| Response Time | Location: NY, Monitored Ct: Login Transa... | BPM | 8:22 9/9/10 | |
| Response Time | Location: London, Monitored Ct: Login Tr... | BPM | 8:20 9/9/11 | |
| Diagnostics | | | | |
| JDBC Wait Time (Avg) | Location: , Monitored Ct: J2EE Application | Diagnostics | 8:07 9/9/10 | |
| OM | | | | |
| CPU Utilization | Location: , Monitored Ct: CRM Host | OM | 8:06 9/9/10 | |
| Transaction Rate #/Sec | Location: , Monitored Ct: CRM DB | OM | 8:07 9/9/10 | |
| CPU Used Percentage | Location: , Monitored Ct: CRM DB | OM | 8:06 9/9/10 | |
| RUM | | | | |
| Response Time | Location: Paris, Monitored Ct: Create Ne... | RUM | 8:21 9/9/10 | |
| Response Time | Location: Amsterdam, Monitored Ct: Creat... | RUM | 8:09 9/9/10 | |
| Sitescope | | | | |
| Transactions Per Second | Location: , Monitored Ct: HR DM | Sitescope | 8:20 9/9/10 | |

Drag Metrics to this area for more details...

CORRELATION OF METRICS MONITORED FROM A VIRTUAL ENVIRONMENT

BACKGROUND

Modern enterprise systems are often complex and monitor a large number of performance metrics, ranging from relatively high-level metrics, such as transaction response time, throughput and availability, to low-level metrics, such as the amount of physical memory in use on each computer on a network, the amount of disk space available, or the number of threads executing on each processor on each computer. Metrics relating to the operation of database systems and application servers, operating systems, physical hardware, network performance, etc. are often monitored, even across networks that may include many computers each executing numerous processes, so that problems can be detected and corrected when or before such problems arise.

Often, however, too much monitoring information may be sent to an administrator. For example, there may be a large number of applications sending information at a given time or there may be a large number of consoles to monitor at the same time. Frequently an enterprise may not have enough experienced administrators to review all of the data generated by the various applications. In addition to monitoring the information, systems, or devices, an administrator may further analyze the data when problems arise to determine a root cause of the problem.

Due to the complexity of the systems, any problems and metrics involved can be large or complex. Some systems have been developed to call attention to those metrics that indicate that there may be abnormalities in system operation and to correlate and group such metrics, so that an operator of the system does not become overwhelmed with the amount of information that is presented. Correlating and grouping metrics may also assist operators to determine the cause of problems that arise, so that the proper corrections can be applied.

Metric correlation generally involves the comparison of each possible pair of metrics. Metric correlation in a large system having thousands of metrics, for example, can involve the comparison of millions of possible pairs of metrics and can quickly become impractical. Additionally, many systems and dynamic and interrelations between metrics can be frequently changed, complicating the task of isolating and correcting system problems.

DETAILED DESCRIPTION

Reference will now be made to the examples illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

One part of a problem management process includes isolation of a problem in order to identify what the problem is. After a problem has been identified, an administrator can attempt to remedy the problem. The following disclosure describes problem isolation systems and methods. More particularly, problem isolation in a virtual environment is described herein. For example, detection of correlations between metrics monitored from a virtual environment is described. The method involves monitoring network operation metrics of network devices in a virtual environment. Network operation metric irregularities exceeding a threshold can be detected. A first network operation metric irregularity can be selected from the detected network operation metric irregularities. A time frame of the first network operation metric irregularity can be identified for analysis. A second network operation metric irregularity can be selected from the detected network operation metric irregularities. The first network operation metric irregularity and the second network operation metric irregularity can be compared to determine a correspondence between the first network operation metric irregularity and the second network operation metric irregularity using a comparison engine and based on a predetermined analysis method. The problem isolation described herein is directed primarily at reactive problem management, but may also be included in proactive problem management solutions.

Detecting correlations between metric behaviors and irregularities across different domains can be a useful tool for analysis of problems in an information technology (IT) environment. Finding problem root causes often involves analyzing tens, hundreds, or even thousands of metric behaviors over time. Prior solutions have involved manual analysis and/or correlation of metrics, which can be inefficient, error-prone, and costly. Because of a large number of metrics involved, as well as an even larger number of possible combinations of those metrics, automatic correlation is generally not practical or even possible. Additional variations, such as a time slot during which to analyze or compare metrics can further complicate correlation and analysis.

Figure 1:
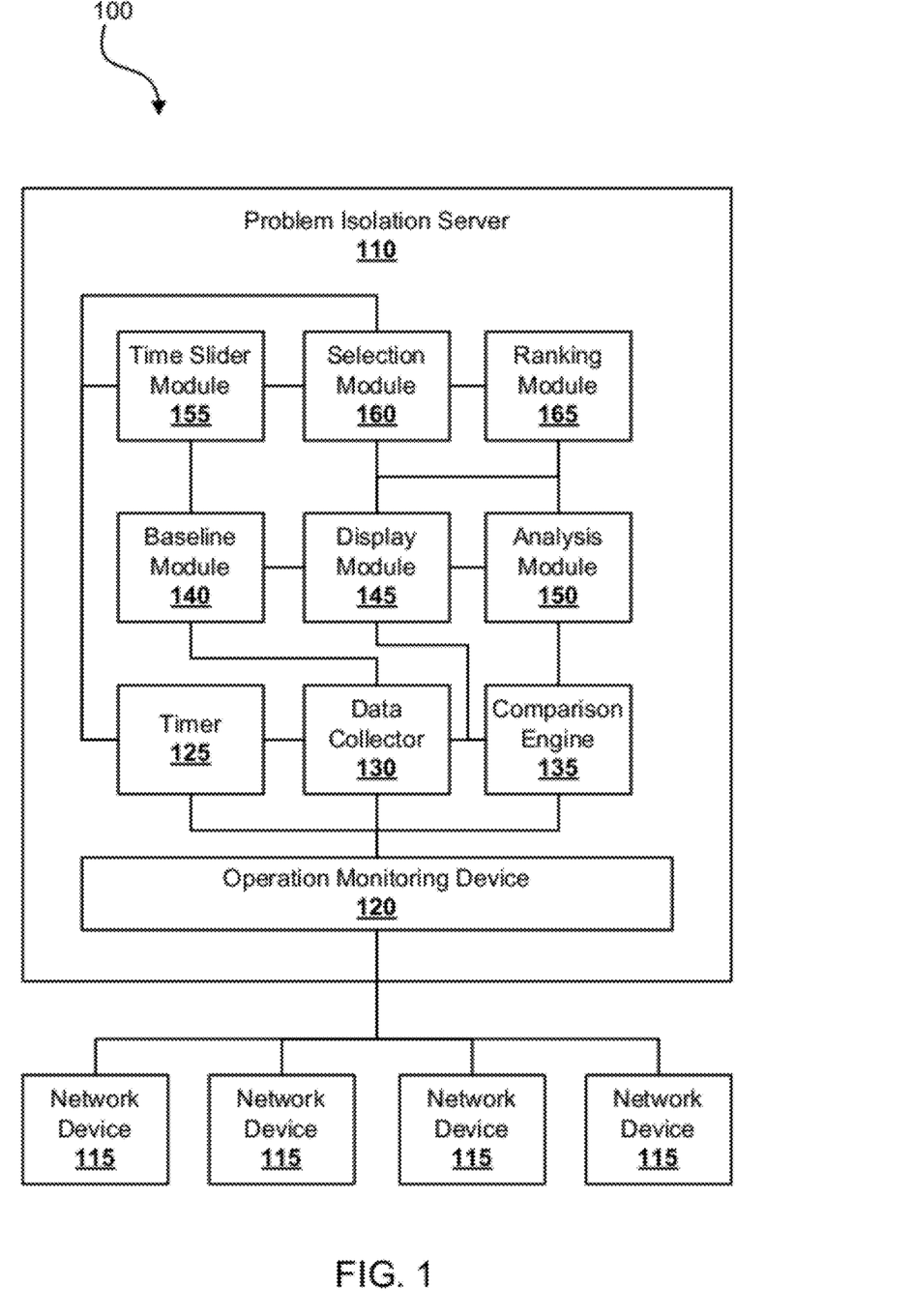
FIG. 1 is a block diagram of a system for correlating network operation metrics monitored from network devices operating in a virtual environment in accordance with an example.

Referring to FIG. 1, a system 100 is shown for correlating network operation metrics monitored from network devices 115 operating in a virtual environment. A virtual environment can include both virtual and physical aspects. For example, a plurality of virtual servers may reside on a physical server. A virtual network may be physically connected to a physical network. A virtual machine may comprise a software and/or hardware-assisted implementation of a machine (e.g., computer). Virtualization can enable creation of system infrastructure on demand, which in turn can enable a fast response to the ever-changing issues facing businesses. Virtualization can allow administrators to manage pooled resources across the enterprise. In addition, virtualization can give developers a way to create test configurations, and then destroy them and start over, without the procurement time and expense of building a dedicated test system, and without disrupting primary operating systems. Server virtualization can bring a new level of availability to business applications that are more affordable and less complex to set up than the traditional methods. Such virtualization techniques can extend to networks, storage, operating systems, applications, and laptop or server hardware, allowing better leverage of infrastructure investments.

Virtual systems tend to be more dynamic and flexible than purely physical systems and are frequently changed. As a result, problem isolation in a virtualized environment can be more challenging than in the purely physical systems. The system 100 of FIG. 1 can assist in isolating and identifying problems in a virtual environment, even after the environment has changed.

The system 100 can include a problem isolation server 110. The problem isolation server can be in communication with the virtualized environment. A performance management database (PMDB) can reside on or be in communication with the problem isolation server and be configured to maintain a topology of configuration items (CIs) representing network devices 115 in the virtual environment.

The PMDB can store a system topology (such as may be obtained from a CMDB), service level information, and business service measurements (or fact measures) within the context of a business service's specific hierarchy. The use of PMDB can assist in problem isolation, business service optimization, and reporting on the results of analysis and/or on measurement data. A business service, or a business service model, may refer to system components such as hosts, virtual machines and so forth. The hosts and virtual machines can have unique identifiers. Monitoring systems produce demand traces for which can have the same unique identifiers as the hosts and virtual machines. When data is loaded into the PMDB via an extract, transform, load (ETL) process, a matching process can be performed to correlate monitoring data from a monitoring system with particular hosts and/or virtual machines in the business service topology. The PMDB can include a data mart for storing topology information, measurement data, etc. The data mart can record information about data stored in the data mart. For example, the data mart may store information such as the time the data was received, the server from which the data was received, a fact (such as topology or measurement data), a service associated with the fact, etc.

The configuration items stored in the PMDB can correspond to managed objects. For example, a managed object may be as simple as a central processing unit (CPU) or as complex as a business service of an enterprise. In other words, configuration items can include hardware, software, or documentation of system components on virtually any scale. There are a large number of pre-existing data models with configuration item types that are defined to model information about complex business service topologies. Common application solution platforms such as SAP, .NET, MS Exchange and others have models of configuration items with known hierarchies that are specific to such platforms.

The PMDB can be a reconciliation of information from the CMDB with operational usage information. A collector infrastructure of the PMDB can gather information from operational usage repositories and the CMDB. ETL content packs, which are software packages that facilitate the integration of data into data warehouses, can read operational usage information, create measurement tables within a data mart, and record measurements and time dimensions. Topology information from the CMDB can guide the content packs' definition of bridge tables, i.e., tables that maintain relationships, in the data mart that puts device measurements into context. In other words, the bridge tables can organize the measurements. Each configuration item in a topology can be inserted as a table row in the bridge tables and is a dimension for categorizing the measurement. Managed object identifier information that is common to both the operational data and the topology data can guide this reconciliation process so that each device is related to a relevant context. For example, within the PMDB, a CPU measurement table may be associated with multiple dimensions that reflect a relationship with a virtual machine (VM), an application server, an application server pool, a constraint, etc. In prior solutions, a CPU measurement may have only been associated with a virtual machine of a particular physical server. In the systems described herein, the multiple dimensions of the relationship can reflect the context of the CPU measurement within the whole business service topology. Metrics, such as CPU usage or power usage at several levels of abstraction (e.g., for a particular application server or for a business service) can be quickly summarized or aggregated. In a similar manner, topology facts can be associated with their constraints.

In one aspect, the monitoring system used with the PMDB comprises an operation monitoring device 120. The operation monitoring device can be operable to monitor the virtual environment for network operation metrics. In a more specific example, the operation monitoring device can monitor the virtual environment for network device operation metrics breaching a baseline.

The system 100 can include an operations tracking module in communication with the operation monitoring device. In one example, the operations tracking module can be a subsystem of the operation monitoring device 120. Both the operations tracking module and the operation monitoring device can be in direct or indirect communication with the PMDB to access or store information related to the network devices 115. The operations tracking module can be configured to track network device operation. In particular, the operations tracking module can track operation of the network device during over a period of time to establish what is normal or usual device operation. In another example, the operations tracking module can be configured to track normal network device operation, or device operation which is known to not be problematic. In either example, the normal device operation metrics can be used to establish a baseline, or a standard by which subsequently monitored metrics are compared. In one aspect, the operations tracking module can directly access data obtained from the operation monitoring device. In another aspect, the operations tracking module can retrieve metrics stored in the PMDB to establish the baseline. The operations tracking module can be configured to periodically update the baseline, for example if normal operation metrics have changed, if a system infrastructure has changed, etc.

The system 100 can include a breach detection module. In one example, the breach detection module can be a subsystem of the operation monitoring device 120. The breach detection module can be configured to detect when monitored network device operation metrics breach the baseline. In one example, the baseline comprises a baseline sleeve. The baseline sleeve can include a range of metrics, within which monitored network device operation metrics may be considered normal. The breach detection module can thus detect when monitored network device operation metrics breach the baseline sleeve, or fall outside of the "normal" range. When the breach detection module detects monitored network device operation metrics breaching a baseline or a baseline sleeve, a breach identification module can identify configuration items in the PMDB related to the network device operation metrics breaching the baseline.

Problem isolation systems can detect problems in near real-time. Once a problem is detected a problem isolation system utilizing the technology described herein can take a topological snapshot of the problem area. The administrator can later analyze the problem and find a root cause even if the environment has changed due to the flexible nature of the virtualized environment.

The processes or system components described above can result in well-defined graphs which represent performance of the network operation metrics. The network operation metrics and/or the graphs representing the performance of the network operation metrics can be stored and used later on by an application owner or administrator who is trying to analyze the problem and a root cause of the problem. Since the problem isolation system has captured the metrics at the time the problem occurred, the system can also show any related change that happened around that time. The ability to capture and record metrics can be very valuable where more and more IT organizations are rapidly moving into virtualized environments. Virtual environments are often flexible and virtual machines can move from one hypervisor to another in a single click. As a result, use of monitored metrics in correlation of metrics can assist in analyzing problems and tracking changes that happen around the time of the problem.

While analyzing problems in a virtualized environment, the topology of the IT system at the time of the problem and any changes that occurred at or near that time can be useful in understanding the problem. The flexible architecture of virtual environments tends to create situations where the environment has changed, such as a machine moving from one hosting server to another for example, between the time the problem was detected and the time when the administrator can analyze the problem. Such scenarios can mislead or confuse a user and the user may spend time trying to analyze irrelevant configuration items.

As described above, problem isolation systems can detect abnormalities or irregularities of metrics of configuration items in near real-time analysis. Metrics can be defined as abnormal, irregular, or anomalous if continuously breaching a baseline or baseline sleeve. The systems can implement analysis cycles to periodically detect abnormal metrics. The analysis cycles can be set to run at predetermined time intervals, such as every five minutes for example. On each analysis cycle, the problem isolation system can detect all continuously abnormal metrics, find the related configuration items for each metric, group all related configuration items based on an Operations Database (ODB) model within the PMDB, and connect each group of configuration items on a graph which represents a single metric's performance.

The system 100 of FIG. 1 can include a timer. The timer can be in communication with the operation monitoring device 120 and can be configured to maintain or obtain a time stamp for the operation data received on the problem isolation server 110. In one aspect, the timer can be a part of the PMDB or in communication with the PMDB to store the time stamps of monitored network events and performance in the PMDB.

A data collector 130 can be in communication with the problem isolation server and be configured to collect metric identifications and associated time stamps of operation data breaching a baseline sleeve in a metrics list. In one example, the data collector can be the PMDB or a portion of the PMDB and can receive the time stamps and performance information from the operation monitoring device 120. In another example, the data collector can be configured to retrieve the time stamps and metric identifications from the PMDB. The list of metric identifications in the metrics list can be prepared for display on a user display device as will be described in further detail below.

The system can include a comparison engine 135. The comparison engine can be configured to compare operation data from a plurality of metric identifications. For example, one or more metrics may be selected from the metrics list and the operation data of the selected metrics can be compared with the comparison engine. The system can also include an analysis module 150. The analysis module can be configured to analyze the compared operation data from the selected metric identifications to determine correlations between the metrics. In other words, the comparison engine can compare the two metrics together and the analysis module can determine how or to what extent the metrics are similar or dissimilar based on the comparison. In one example, the comparison engine and the analysis module may comprise a same, integral, single engine or module and the operations described above regarding the comparison engine and the analysis module can be performed by the single engine or module. In another example, the comparison engine is configured to compare and correlate selected metrics while the analysis module can provide an underlying basis or method of comparison for use by the comparison engine. For example, the analysis module may comprise a linear analysis module, a statistical analysis module, an event to event analysis module. The analysis module may also be configured to perform or provide a basis for any other suitable form of analysis. In one aspect, the analysis module is configured to receive a user selection of a desired form of analysis via the GUI and the comparison engine utilizes the user-selected analysis method. The system can also include a ranking module 165 configured to rank the selected metrics or metric identifications according to a degree of correlation of the metric operation performance data and/or graph(s).

The system 100 can include a display module 145. The display module can be configured to graphically display monitored metrics or operation data associated with metric identifications in a network operation graph. As described above, a list of metrics breaching a baseline can be assembled. The display module can enable a user to drag one or more selected metrics on a graphical user interface (GUI) from the metrics list to a correlation window. This and other capabilities enabled by the display module will be described in further detail below.

The system can include a baseline module 140. The baseline module can be configured to monitor normal network device operation to determine the baseline sleeve and to display the baseline sleeve on the network device operation graph simultaneously with the graphically displayed metrics or metric identifications.

The system can include a time slider or time slider module 155 configured to adjust a time view of the network device operation graph by sliding the time view forward or backward in time. The time slider module can be configured to redraw the network device operation graph and the baseline sleeve when a user slides the displayed time view forward or backward in time so that characteristics of the metric displayed on the network device operation graph during the adjusted time view are accurately displayed.

The system can include a graphical time selection module, also referred to as a time selection module, or more simply a selection module 160. The selection module can enable graphical selection of one or more time frames from the network device operation graph. This feature will be described in further detail below.

The metric correlation described above may be a part of a problem isolation investigation user interface and can be a part of a GUI which allows easy rating of large quantities of metrics using various user-selectable correlation methods.

Figure 2:
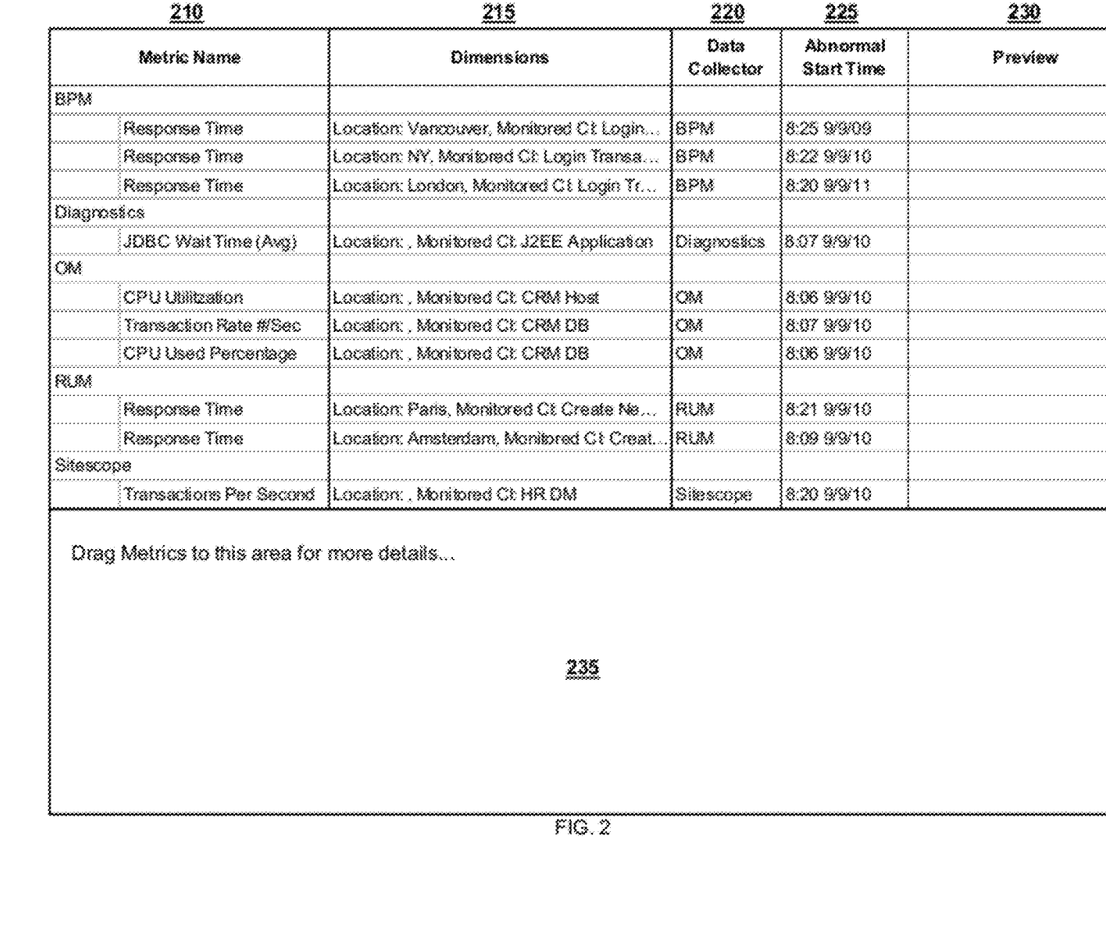
FIG. 2 is a block diagram of a graphical user interface (GUI) for displaying monitored metrics and associated data in accordance with an example.

Referring now to FIG. 2, a block diagram of a graphical user interface (GUI) for displaying monitored metrics and associated data is shown in accordance with an example. The GUI can display monitored metrics or various data regarding the monitored metrics. In one aspect, the GUI can be configured to display those metrics with operations breaching a baseline or a baseline sleeve. The GUI of FIG. 2 can display various information about a metric breaching a baseline sleeve, such as a name of the metric 210, a dimension of the metric 215, what data collector 220 is monitoring the metric, when abnormal metric performance began 225, and a preview 230 of a graph of the metric performance. The metric names shown in FIG. 2 are further organized according to groups. The groupings can be according to application, business service, function, location, or any of a variety of other potential group identifications. The dimensions can include a variety of different metrics dimensions.

For example, a metric dimension may be a location of the monitored metric or a name of the configuration item associated with the metric name. An abnormal start time can include both a date and a time of when the abnormal operation performance began. Though not shown in FIG. 2, the GUI can also display other time information such as when the abnormal operation performance ended, or how long the abnormal performance continued. The GUI can also include a metric display area 235. The GUI can be configured to enable a user to select and drag a metric from the list of metrics above the metric display area into the metric display area. A metric or a graph of the metric can be displayed in the display area after the metric is dragged into the display area. The preview displayed with the metric can correspond to the graph of the metric to be displayed in the display area.

Figure 3:
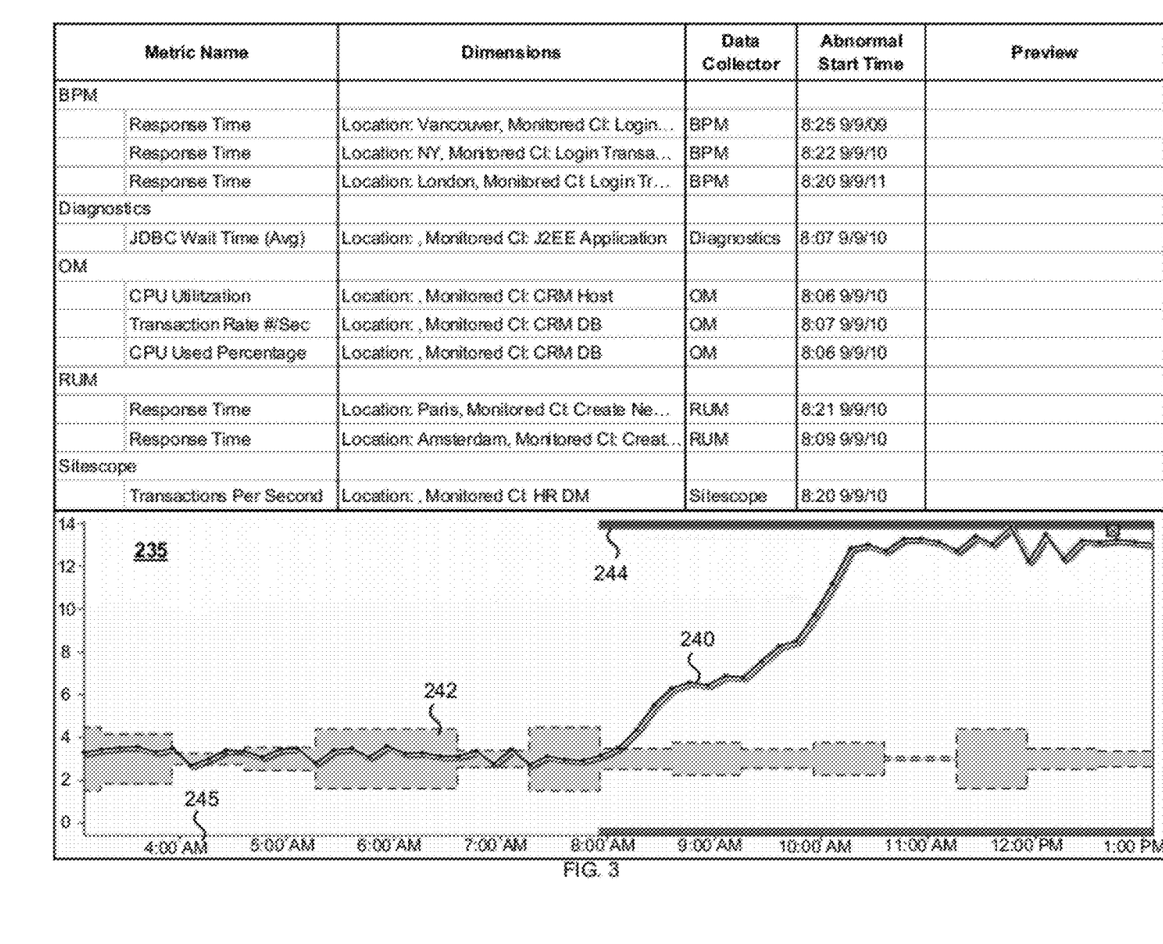
FIG. 3 is a block diagram of a GUI for displaying monitored metrics and associated data, including a displayed metric and associated baseline sleeve along a timeline, in accordance with an example.

Referring to FIG. 3, a block diagram of a GUI for displaying monitored metrics and associated data is shown which includes a displayed metric 240 and associated baseline sleeve 242 along a timeline 245 in a display area 235, in accordance with an example. The displayed metric or graph of the metric in the display area of FIG. 3 corresponds with the metric Response Time located in Paris and monitored by data collector RUM. The graph shown in the display area also corresponds to the preview graph shown with the Response Time metric above.

The baseline sleeve 242 can be represented as a shaded area or by outlines or both. The baseline sleeve graphical representation can enable clear visibility of when metric operation performance became abnormal and breached the baseline. The display area 235 shown in FIG. 3 can also include a problem marker 244 which extends along a top and a bottom of a frame of the display area. The problem marker can provide a clear indication of where problematic or abnormal metric operation performance began and/or a clear indication of where in time and for what period of time problematic or abnormal metric operation performance existed. The problem marker can be next to the timeline 245 to enable easy correspondence of problematic performance with time. In one aspect, the problem marker can mark abnormal performance or activity as beginning when a monitored metric actually breaches the baseline sleeve. In another aspect, the problem marker can mark abnormal performance or activity as beginning before the monitored metric breaches the baseline sleeve. For example, the problem marker can mark abnormal performance or activity as beginning one or two monitoring cycles before the breach since a root cause of the breach likely began before the actual breach. How soon the problem marker marks abnormal activity before the breach can vary between systems and by administrator preference. The display area of FIG. 3 also includes an "X" to enable a user to cancel a selection of a metric for display in the display area.

Figure 4:
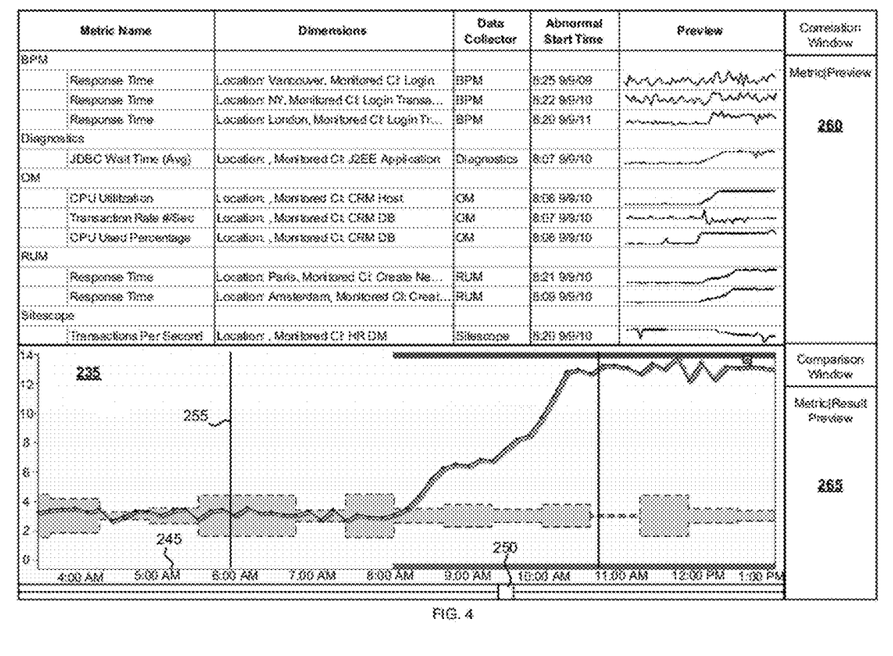
FIG. 4 is a block diagram of a GUI for displaying monitored metrics and associated data, including a selected time frame and correlation and comparison windows, in accordance with an example.

Referring to FIG. 4, a block diagram of a GUI for displaying monitored metrics and associated data is shown which includes a selected time frame 255 as well as correlation 260 and comparison 265 windows, in accordance with an example. The correlation window and comparison window will be described in further detail with regards to FIG. 5 later.

After an administrator has displayed a metric in the display area 235, the administrator may wish to perform a correlation of the metric with other metrics to determine a possible root cause of performance issues. Metrics can be monitored continuously over very long periods of time. Correlation with a large amount of the monitored data for a selected metric with a similarly large amount of the monitored data for any other metric or set of metrics can be excessive and put a significant strain on a computer processor, if the computer processor is able to process the large amount of data at all. A metric displayed in the display area may be only a limited view of the metric. For example, the display area may be configured to display a certain range of time over which the displayed metric was monitored. For example, monitored metric data may be available for a period of several hours, days, weeks, months, or more. The display area may be configured to graphically display a small portion of the available data. In one example, the display area can be configured to default to a time period including the latest problematic metric performance. As another example, the display area can be configured to default to a most recent range of monitored time.

An administrator can change the time period to include data over a longer or shorter time period. Also, the display area can include a time slider 250. The time slider can be positioned near the time line 245. The time slider can enable an administrator to slide the graph of monitored data backward and forward in time to obtain different views of the graph at different time periods. For example, the time slider can be configured to slide to the right or to the left corresponding to user input. Movement of the time slider to the right can advance the graph and the time line to a position later in time. Movement of the time slider to the left can advance the graph and the time line to a position earlier in time.

When a desired view of the graph is displayed in the display area 235, such as after an administrator has performed any desired modifications to a position along the time line or a range of time displayed in the display area, a portion of the displayed graph can be selected for correlation. For example, an administrator can select a time interval 255 via the GUI, where the time interval represents a time during which metric performance data will be compared with and correlated against performance data of other metrics. An administrator can select the time frame using a variety of methods. For example, the GUI can enable the administrator to click and drag a pointer to select a time frame. A time frame can be selected according to the view within the display area. In other words, the time range displayed can be used as the time frame. In another example, the GUI can include an icon which when clicked prompts the administrator to select a start and end time for the time frame. In yet another example, the GUI can include an icon which when clicked places indicators of start and stop times for the time frame onto the display area and the administrator can click and drag the indicators to a desired position along the time line. In one aspect, the time frame can be represented by at least two vertical graphical bars designating a start and stop time for the time frame selection. In another aspect, the selected time frame can be represented by highlighting or shading a selected area. Other forms of selecting a time frame and displaying the selected time frame are also contemplated and considered within the scope of this disclosure.

Figure 5:
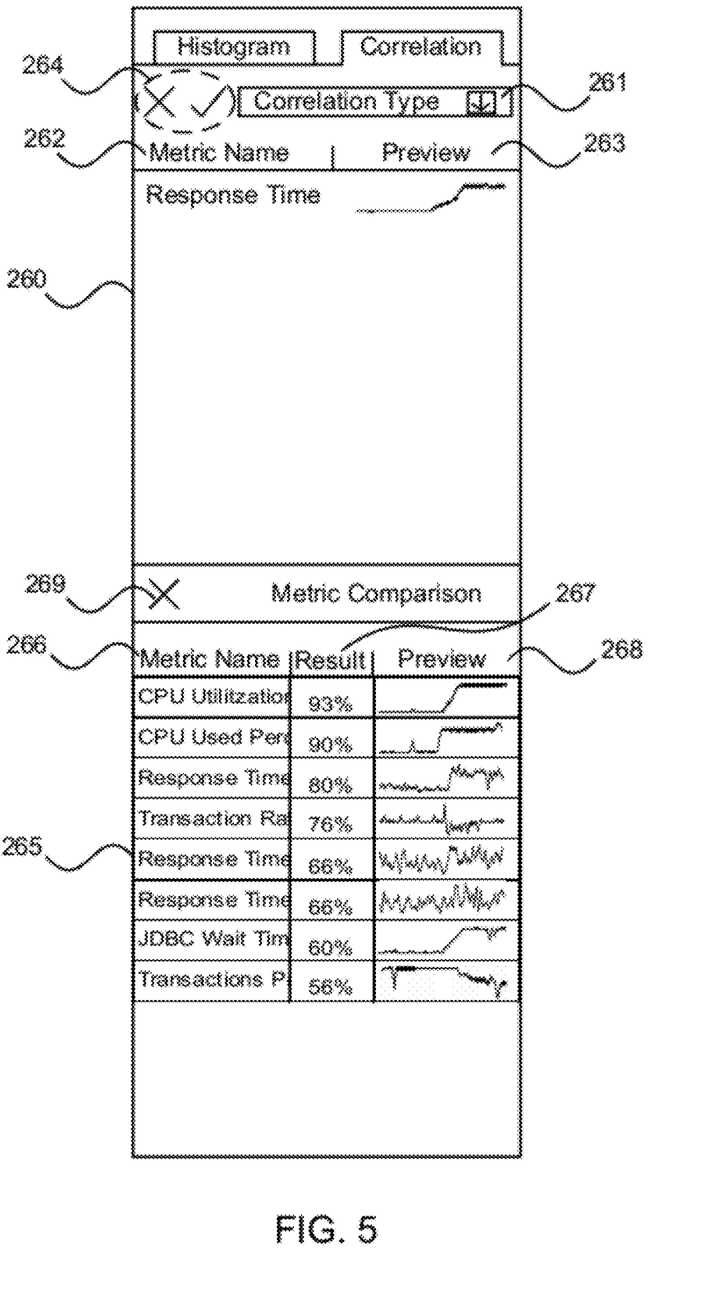
FIG. 5 is a block diagram of the correlation and comparison windows of FIG. 4.

FIG. 5 is a block diagram of the correlation 260 and comparison 265 windows of FIG. 4. In one aspect, the comparison window is merely a subset or a frame within the correlation window. In one aspect, the correlation window may comprise a tab selectable from a plurality of tabs, each configured to provide a different display of metric related information and/or operations performable by the system on the metric(s). An example of another tab in the plurality of tabs includes a histogram tab, which will be described in further detail below regarding FIG. 8.

When a time frame has been selected on the graph in the display area, as described above regarding FIG. 4, the correlation window can display the name 262 of the metric from which the time frame was selected, as well as a preview 263 of the selection. In an alternate example, the preview can include the same preview graph as shown in the preview column 230 in FIG. 2, and though the preview differs from the selected time frame, the system can still use the selected time frame rather than the data represented by the preview in performing correlation operations on the data. However, providing a correlation window preview which is based on the time frame selection instead of simply reusing the earlier presented preview graph can help avoid confusion as to what data is being correlated or considered for correlation.

The correlation window 260 can include an interface 261 for a user to select a correlation method by which the selected time frame of the selected metric is correlated with or compared against other metrics. Some example correlation methods include: linear comparisons of whether and when the network device operation metric irregularities exceeded the threshold; statistical comparison of a degree by which the network device operation metric irregularities exceeded the threshold; and event to event comparison of causal links between the network operation metric irregularities that exceeded the threshold. Other correlation methods may also be implemented without departing from the scope of this disclosure. The correlation window can include correlation controls 264 which can cause the correlation engine to start or stop correlation of metrics or to remove one or more selected metrics from consideration for correlation.

The comparison window 265, as described above, can be a portion of the correlation window and can provide results of the comparison of the selected time frame of the selected metric with other metrics displayed in the comparison window. The GUI can enable the administrator to drag one or more desired metrics from the metrics list into the comparison window to be compared and correlated with the metric selected and listed above in the correlation window. In one aspect, metrics placed in the comparison window can be identified by metric name 266. Also, the metrics in the comparison window can include a metric preview 268 which can be either the same preview as displayed in the metric list or a preview based on the selected time frame for the metric(s) in the correlation window. After one or more metrics have been placed in the comparison window, the correlation engine can begin correlation of the correlation window metric(s) with the comparison window metric(s). The result of the comparison can be displayed in a result column 267 of the comparison window. The format and type of the result may vary depending on the selected correlation method. In the example shown, the result column displays a degree or percentage of correlation of the comparison window metrics with the correlation window metric. The results can be ordered according to highest degree of correlation, lowest degree of correlation, order of comparison window metric selection, or any other desired ordering.

Figure 6:
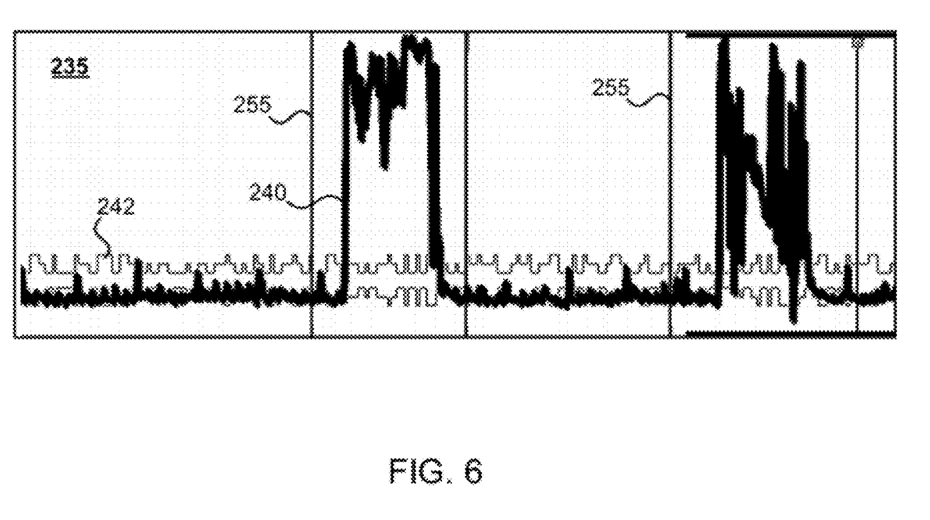
FIG. 6 is a graph of a monitored metric with an associated baseline sleeve illustrating selection of multiple time frames for correlation in accordance with an example.
Figure 7:
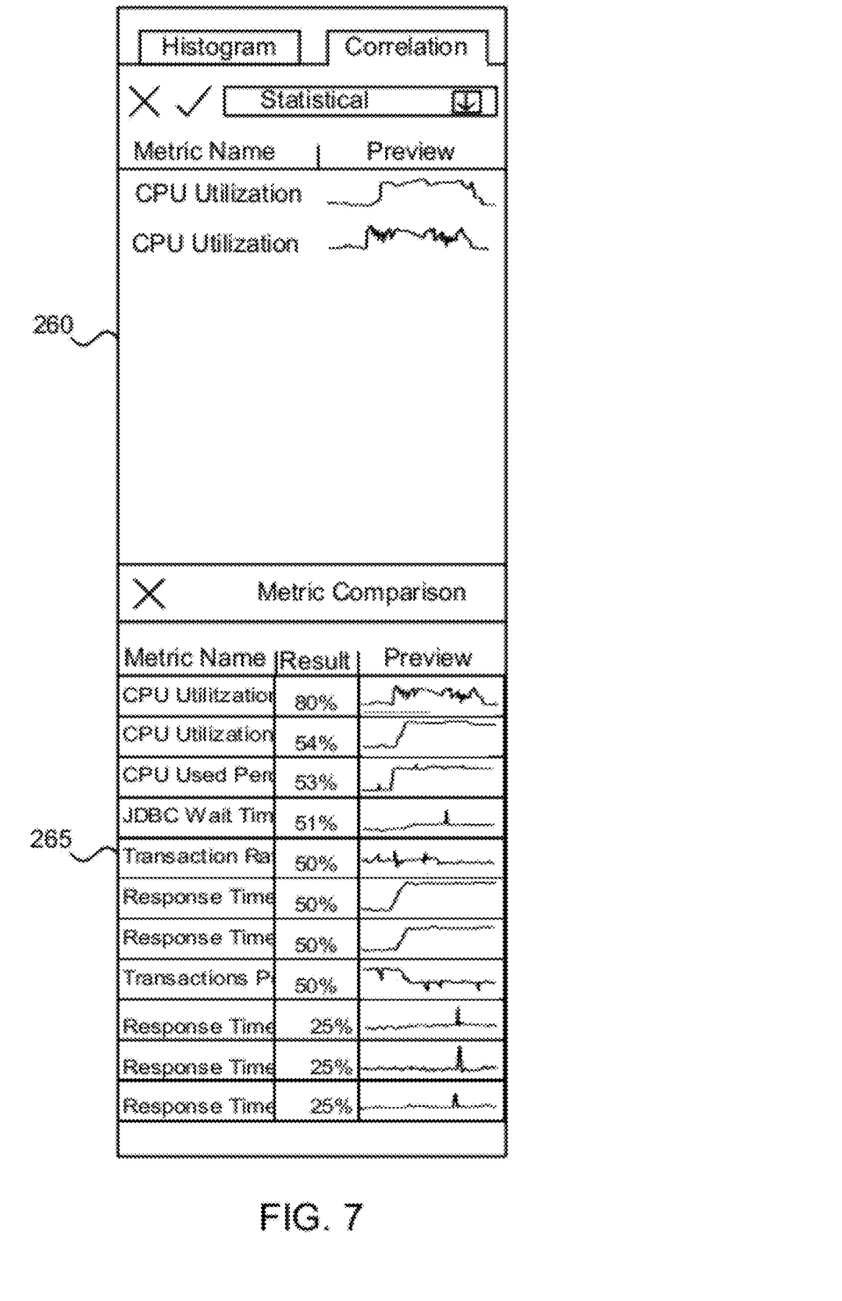
FIG. 7 is a block diagram of correlation and comparison windows for comparison of metrics with the multiple time frames of FIG. 6 in accordance with an example.

While FIG. 5 illustrates the selection of a single time frame for correlation, the system can enable selection of multiple time frames for correlation. Referring to FIG. 6, a graph is shown of a monitored metric 240 with an associated baseline sleeve 242 illustrating selection of multiple time frames 255 for correlation. FIG. 7 shows a correlation window 260 including the name of the metric from the display area of FIG. 6 and previews of the selected time frames. The selected time frames can then be correlated with any number of desired metrics, as shown in the comparison window 265. In one aspect, the system can enable an administrator to select one or more time frames from multiple different metrics to be placed in the correlation window and compared against other selected metrics placed in the comparison window.

Figure 8:
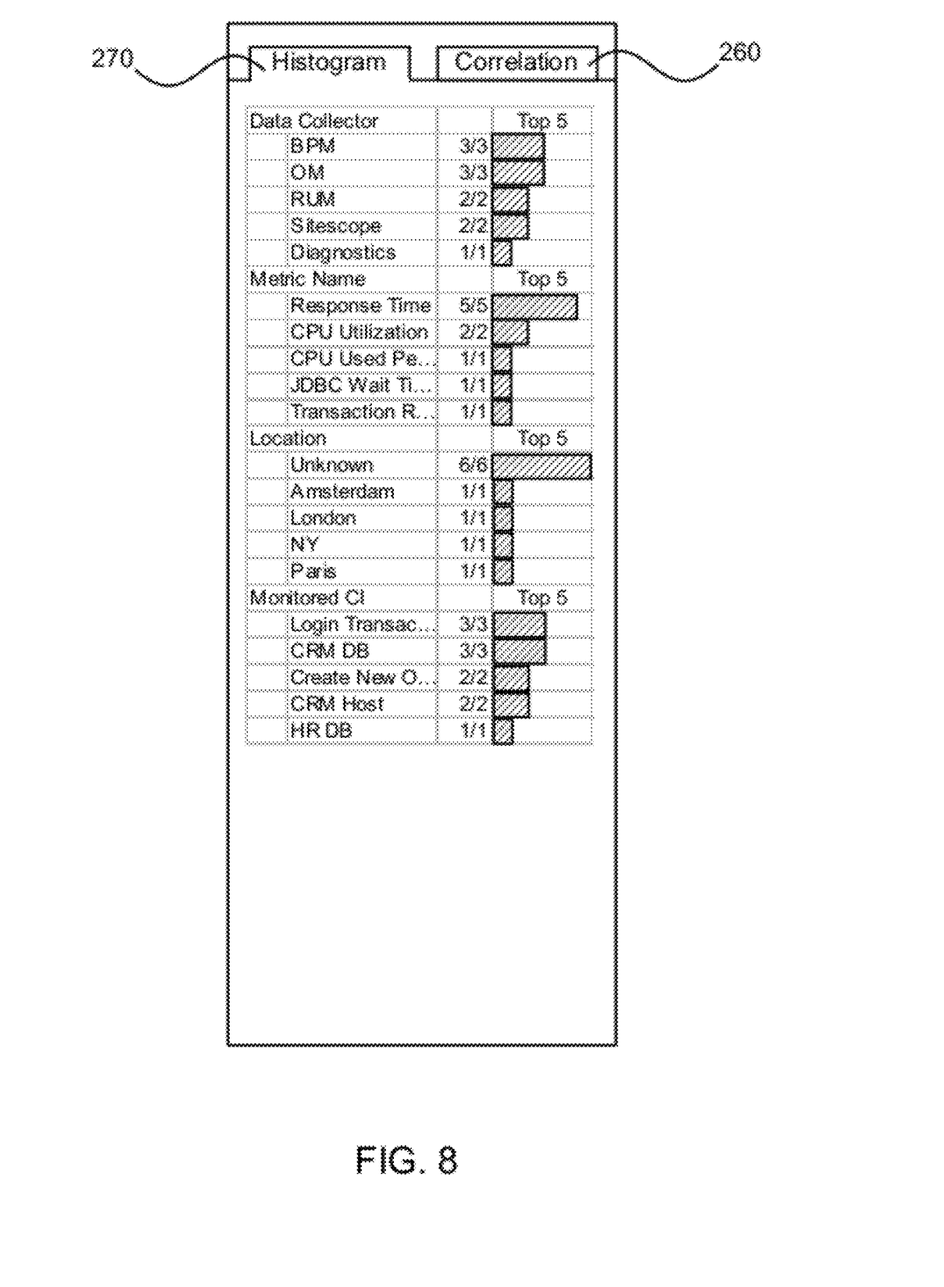
FIG. 8 is a block diagram of a histogram display of monitored metrics in accordance with an example.

FIG. 8 depicts a block diagram of a histogram display 270 of monitored metrics in accordance with an example. The histogram display can display histograms or frequency distributions generated by a histogram module. The histograms can represent a variety of different details relating to the metrics in the metric list. For example, the histogram display can display how many metrics of a particular metric group breached a baseline, or how often or how many times a particular metric breached a baseline, such as within a predetermined time period. Virtually any form of desired histogram based on the metrics can be displayed in the histogram display. In one aspect, the histograms can be sorted according to various factors, such as location, monitored configuration item, metric name, data collector, and so forth.

Figure 9:
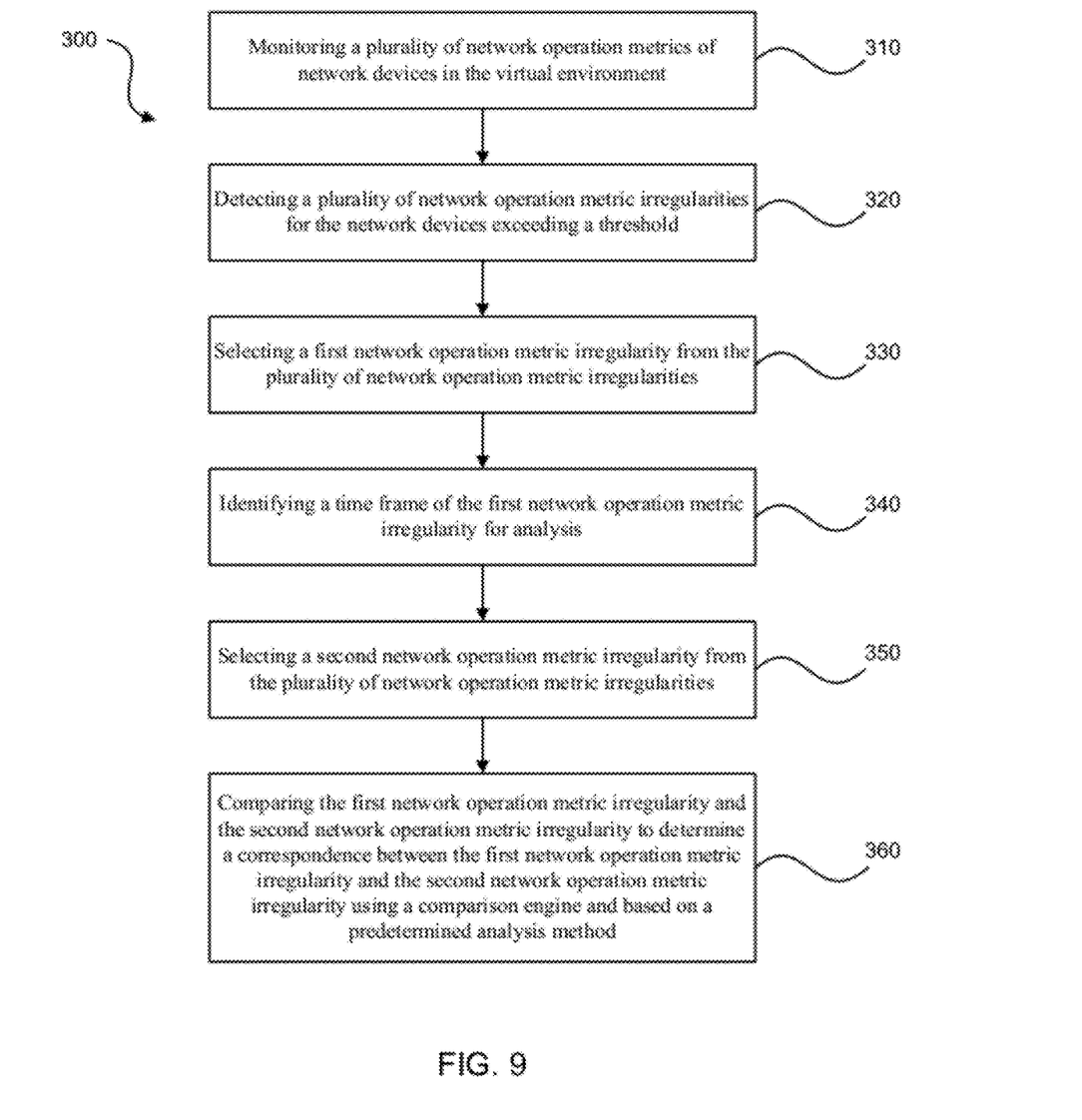
FIG. 9 is a flow diagram of a method for detecting correlations between metrics monitored from a virtual environment.

A flow diagram of a method 300 is shown in FIG. 9 for detecting correlations between metrics monitored from a virtual environment includes monitoring 310 network operation metrics of network devices in the virtual environment. Network operation metric irregularities exceeding a threshold are detected 320. A first network operation metric irregularity is selected 330 from the detected network operation metric irregularities. A time frame of the first network operation metric irregularity is identified 340 for analysis. A second network operation metric irregularity is selected 350 from the detected network operation metric irregularities. The first network operation metric irregularity and the second network operation metric irregularity can be compared 360 to determine a correspondence between the first network operation metric irregularity and the second network operation metric irregularity using a comparison engine and based on a predetermined analysis method.

The method can further include determining a degree of correlation between the first network operation metric irregularity and the second network operation metric irregularity based on the comparing of the first network operation metric irregularity and the second network operation metric irregularity. Analysis of correspondence in the method can include chronologically analyzing the correspondence between the first metric anomaly and the second metric anomaly such that a point in the first time frame is compared against a same absolute point in time from the second time frame. The method can include performance of analysis methods such as linear comparison, statistical comparison, event to event comparison, and so forth.

The problem isolation systems, methods, and user interface can offers unique correlation tools which combine human knowledge and common sense with the power of computing systems, methods, and displays. While analyzing an abnormal metric in a problem isolation GUI, an administrator can easily mark time slots for correlation and the system can automatically rank all other metrics based on the selected time slot. The administrator can also choose a combination of metrics and time slots for more advanced correlation.

The administrator can choose between different correlation methods. Event to event correlation can convert metrics into a set of events. Each event can be a metric baseline sleeve breach. The correlation engine can rate highest those metrics which have baseline breaches once the base metric being compared against is also breaching a baseline sleeve. In one example, linear correlation can be based on or similar to pearson's correlation. Event to metric correlation can be based on the Hewlett-Packard Statistical Learning, Inference and Control method, also known as SLIC.

The ability to choose any combination of time frames and metrics for correlation offers a powerful analysis tool for problem investigation, which can be illustrated with the following example. While a user is investigating a problem, he detects that the problem is reoccurring in a specific transaction between 2:00-4:00 AM PST on every Friday during the last month. The user would like to find which metrics in the system are the most correlated with this behavior. Trying to correlate this metric with hundreds of system metrics over a full month period is not practical in term of capacity. With the correlation system the user can easily mark the specific time frames over the last month and correlate only 8 hours instead of a full month. In a more complex example, the user might want to correlate more than one transaction with more than one time frame with a set of other metrics, such as if the user suspects that two different transactions are behaving abnormally because of the same infrastructure metric for example. With the correlation system the user can correlate any combination of metrics and time frames with another set of metrics.

Figure 10:
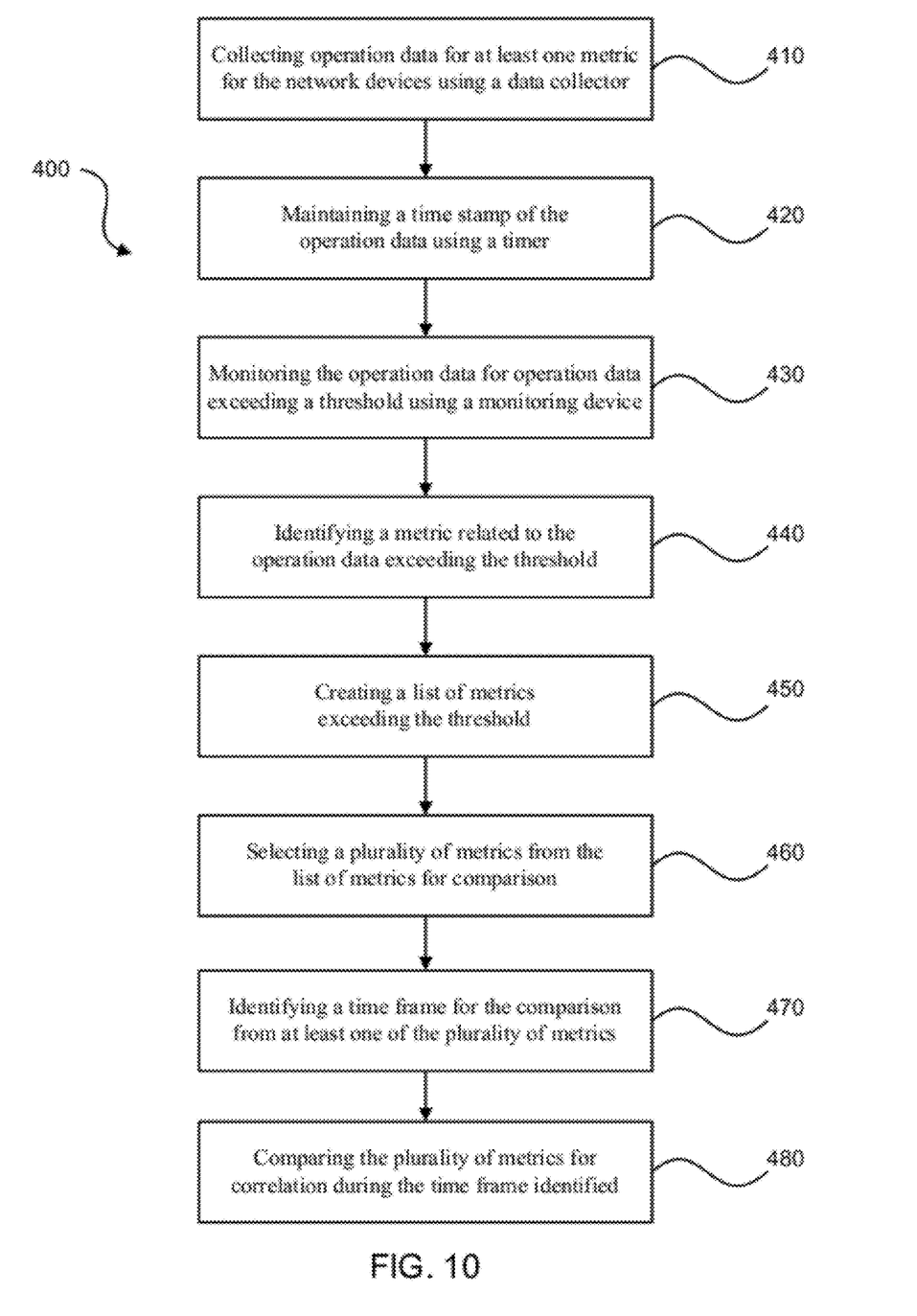
FIG. 10 is a flow diagram of a method for correlating network operation metrics monitored from network devices operating in a virtual environment.

Referring to FIG. 10, a flow diagram of a method 400 is shown for correlating network operation metrics monitored from network devices operating in a virtual environment in accordance with an example. The method can include collecting 410 operation data for at least one metric for the network devices using a data collector. A time stamp of the operation data can be maintained 420 using a timer. The operation data can be monitored 430 for operation data exceeding a threshold. A metric related to the operation data exceeding the threshold can be identified 440. A list of metrics exceeding the threshold can then be created 450. At least two metrics from the list of metrics can then be selected 460 for comparison. The method can include identifying 470 a time frame for the comparison from at least one of the at least two metrics, and can further include comparing 480 the at least two metrics for correlation during the time frame identified using a processor.

The method can further include identifying a start time of when the operation data exceeded the threshold and displaying the start time to a user via a display device. In a more specific example, the method further includes displaying a preview of graphs of the at least two metrics selected from the list of metrics and enabling the user to select at least one of the at least two metrics for full-view display of a graph simultaneously with the preview of the graphs. The method can still further include displaying a baseline sleeve of the at least one of the at least two metrics selected for full-view display in the full-view display and enabling the user to graphically identify a time frame on the full-view display for correlation with at least one other of the at least two metrics. In one aspect, the method further comprises adjusting a view of the full-view display using a time slider by sliding a displayed time view forward or backward in time, wherein sliding the displayed time view forward or backward comprises redrawing the graph and the baseline to accurately depict characteristics of the metric during the adjusted time view. In another aspect, the method further comprises displaying the metric and a preview of the time frame identified for the metric on the full-view display in a correlation window; enabling the user to select a correlation method from a plurality of correlation methods; selecting the at least one other of the at least two metrics to correlate with metric displayed in the correlation window; displaying the selected at least one other of the at least two metrics in a comparison window; determining a percentage of correlation between the metric displayed in the correlation window and the metric displayed in the comparison window based on a selected correlation method and using a processor; and displaying the percentage of correlation to the user via the display device.

Combining advanced correlation systems, methods, and displays with human knowledge and common sense can offer new capabilities for problem investigation and analysis. Some benefits of the correlation systems, methods, and displays described herein include enabling a user to correlate any set of metrics with another set of metrics, enabling a user to select specific timeframes for the correlation, enabling a user to select multiple time frames from different metrics and correlate all of the time frames together against a set of metrics, and enabling a user to quickly switch between different correlation methods, which may each different advantages and disadvantages.

The methods and systems of certain examples may be implemented in hardware, software, firmware, or combinations thereof. In one example, the method can be executed by software or firmware that is stored in a memory and that is executed by a suitable instruction execution system. If implemented in hardware, as in an alternative example, the method can be implemented with any suitable technology that is well known in the art.

Also within the scope of an example is the implementation of a program or code that can be stored in a nontransitory machine-readable medium to permit a computer to perform any of the methods described above.

Some of the functional units described in this specification have been labeled as modules, in order to more particularly emphasize their implementation independence. The various modules, engines, tools, or modules discussed herein may be, for example, software, firmware, commands, data files, programs, code, instructions, or the like, and may also include suitable mechanisms. For example, a module may be implemented as a hardware circuit comprising custom VLSI (Very Large Scale Integration) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A method for detecting correlations between metrics monitored from a virtual environment, comprising:
    monitoring a plurality of network operation metrics of network devices in the virtual environment;
    detecting a plurality of network operation metric irregularities for the network devices exceeding a threshold;
    selecting a first network operation metric irregularity from the plurality of network operation metric irregularities;
    identifying a time frame of the first network operation metric irregularity for analysis;
    selecting a second network operation metric irregularity from the plurality of network operation metric irregularities; and
    comparing the first network operation metric irregularity and the second network operation metric irregularity to determine a correspondence between the first network operation metric irregularity and the second network operation metric irregularity using a comparison engine and based on a predetermined analysis method.

2. A method as in claim 1, further comprising determining a degree of correlation between the first network operation metric irregularity and the second network operation metric irregularity based on the comparing of the first network operation metric irregularity and the second network operation metric irregularity.

3. A method as in claim 1, wherein the time frame comprises a first time frame and the method further comprises identifying a second time frame of the second network operation metric irregularity for analysis.

4. A method as in claim 3, wherein analyzing correspondence further comprises chronologically analyzing the correspondence between the first network operation metric irregularity and the second network operation metric irregularity such that a point in the first time frame is compared against a same absolute point in time from the second time frame.

5. A method for correlating network operation metrics monitored from network devices operating in a virtual environment, comprising:
    collecting operation data for at least one metric for the network devices using a data collector;
    maintaining a time stamp of the operation data using a timer;
    monitoring the operation data for operation data exceeding a threshold using a monitoring device;
    identifying a metric related to the operation data exceeding the threshold;
    creating a list of metrics exceeding the threshold;
    selecting a plurality of metrics from the list of metrics for comparison;
    identifying a time frame for the comparison from at least one of the plurality of metrics; and
    comparing the plurality of metrics for correlation during the time frame identified using a processor.

6. A method as in claim 5, further comprising:
    identifying a start time of when the operation data exceeded the threshold; and
    displaying the start time to a user via a display device.

7. A method as in claim 6, further comprising:
    displaying a preview of graphs of the plurality of metrics selected from the list of metrics; and
    enabling the user to select at least one of the plurality of metrics for full-view display of a graph simultaneously with the preview of the graphs.

8. A method as in claim 7, further comprises:
    displaying a baseline sleeve of the at least one of the plurality of metrics selected for full-view display in the full-view display; and
    enabling the user to graphically identify a time frame on the full-view display for correlation with at least one other of the plurality of metrics.

9. A method as in claim 8, further comprising:
    displaying the metric and a preview of the time frame identified for the metric on the full-view display in a correlation window;
    enabling the user to select a correlation method from a plurality of correlation methods;
    selecting the at least one other of the plurality of metrics to correlate with metric displayed in the correlation window;
    displaying the selected at least one other of the plurality of metrics in a comparison window;
    determining a percentage of correlation between the metric displayed in the correlation window and the metric displayed in the comparison window based on a selected correlation method and using a processor; and displaying the percentage of correlation to the user via the display device.

10. A system for correlating network operation metrics monitored from network devices operating in a virtual environment, comprising:
   a problem isolation server in communication with the network devices and configured to receive operation data for at least one metric for the network devices;
   a timer configured to maintain a time stamp for the operation data received on the problem isolation server;
   a data collector in communication with the problem isolation server configured to collect metric identifications and associated time stamps of operation data breaching a baseline sleeve in a metrics list;
   a comparison engine configured to compare operation data from a plurality of metric identifications;
   an analysis module configured to analyze the compared operation data from the plurality of metric identifications to determine correlations between the plurality of metric identifications.

11. A system as in claim 10, further comprising display module configured to graphically display the at least one of the plurality of metric identifications in a network device operation graph and to enable a user to drag one or more selected metrics from the metrics list to a correlation window.

12. A system as in claim 11, further comprising a baseline module configured to monitor normal network device operation to determine the baseline sleeve and to display the baseline sleeve on the network device operation graph simultaneously with the graphically displayed at least one of the plurality of metric identifications.

13. A system as in claim 12, further comprising a time slider configured to adjust a time view of the network device operation graph by sliding the time view forward or backward in time, wherein sliding the displayed time view forward or backward comprises redrawing the network device operation graph and the baseline sleeve to accurately depict characteristics of the metric displayed on the network device operation graph during the adjusted time view.

14. A system as in claim 13, further comprising a graphical time selection module configured to enable graphical selection of one or more time frames from the network device operation graph.

15. A system as in claim 10, further comprising a ranking module configured to rank the plurality of metric identifications according to a degree of correlation.

* * * * *